(12) United States Patent
Bajwa et al.

(10) Patent No.: US 7,912,188 B2
(45) Date of Patent: *Mar. 22, 2011

(54) CENTRALIZED FEATURE PLATFORM IN A PACKETIZED NETWORK

(75) Inventors: Husnain Bajwa, Austin, TX (US);
Samuel R. Shiffman, Austin, TX (US);
Michael J. Holloway, Austin, TX (US)

(73) Assignee: Unipoint Holdings, Inc. DE (US)

( * ) Notice: Subject to any disclaimer, the term of this patent is extended or adjusted under 35 U.S.C. 154(b) by 690 days.

This patent is subject to a terminal disclaimer.

(21) Appl. No.: 11/462,212

(22) Filed: Aug. 3, 2006

(65) Prior Publication Data

US 2007/0058787 A1    Mar. 15, 2007

Related U.S. Application Data

(63) Continuation of application No. 09/721,220, filed on Nov. 22, 2000, now Pat. No. 7,539,155.

(60) Provisional application No. 60/225,600, filed on Aug. 15, 2000.

(51) Int. Cl.
*H04M 1/64* (2006.01)

(52) U.S. Cl. ............... 379/88.17; 379/88.18; 379/88.19; 379/88.2

(58) Field of Classification Search .................. 370/217, 370/230, 252, 259, 261, 267, 271, 400, 401, 370/351, 352, 353, 356; 709/245; 379/114, 379/173, 210, 211, 212, 215, 309, 900
See application file for complete search history.

(56) References Cited

U.S. PATENT DOCUMENTS

| | | | |
|---|---|---|---|
| 6,373,817 B1 * | 4/2002 | Kung et al. .................. 370/217 |
| 6,426,955 B1 * | 7/2002 | Gossett Dalton et al. .... 370/401 |
| 6,614,780 B2 * | 9/2003 | Hakim et al. ................. 370/352 |
| 7,539,155 B1 * | 5/2009 | Bajwa et al. ............... 370/310.2 |

* cited by examiner

*Primary Examiner* — Chi H Pham
*Assistant Examiner* — Kouroush Mohebbi
(74) *Attorney, Agent, or Firm* — The Law Firm of H. Dale Langley, Jr., P.C.

(57) ABSTRACT

A packetized telecommunication network directs a call that is received at a gateway of the network to connect to a feature platform via the network, which performs a service related to the call, such as an authentication service. After the service is performed, the call is redirected to another location in the network to provide a connection between the gateway and the other location, which connection is independent of the feature platform.

27 Claims, 2 Drawing Sheets

CENTRALIZED FEATURE PLATFORM IN A PACKETIZED NETWORK

CROSS REFERENCE TO RELATED APPLICATIONS

This application claims the benefit of U.S. Provisional Application No. 60/225,600, filed Aug. 15, 2000, which is incorporated herein by reference in its entirety.

BACKGROUND OF THE INVENTION

1. Field of the Invention

This invention relates to packetized telecommunication networks and more particularly to use of a centralized feature platform.

2. Description of the Related Art

When a telecommunication system receives a call, the system often needs to authenticate the call in some manner, to ensure, e.g., the validity of a calling card number, a personal identification number or some other credential associated with the call. Traditionally, in circuit switched telephone networks the standard call flow for an authentication service for a calling card is as follows. Assume a calling card call is received in a telephone network. The call is connected, to a facility having authentication capability, e.g., an Interactive Voice Response (IVR) function that prompts the caller for pertinent information, such as the calling card number and the number the caller is trying to reach. The IVR function either validates the call or drops the call. If the call is validated by the authentication facility, then the call is connected to its calling destination through the authentication function. Thus, as shown in FIG. 1, the facility 101 that validated the call functions as an in-line relay between the call origin 103 and the call destination 105 since the call is still connected through the authentication facility.

While that solution may be acceptable for switched circuit networks (e.g., for telephone systems with class 4 and above circuit switches) which tend to have a lot of "edge centralization" on the network, for emerging packet switched based telephone networks, placing complex functionality in multiple places on the edge of a network can be expensive and therefore undesirable.

Accordingly, it would be desirable to provide the functionality of feature services such as authentication without the cost and complexity of duplicating resources in multiple places in a packet-based telecommunications network.

SUMMARY OF THE INVENTION

Accordingly, in one embodiment, the invention provides a method that includes receiving a call at a gateway of a packetized telecommunication network, directing the call to connect to a feature platform via the network and performing a service related to the call in the feature platform. After the service is performed, the call is transferred to another location in the network to provide a connection between the gateway and the other location, which connection is independent of the feature platform. The service may be an authentication service.

In another embodiment the invention provides a method of authenticating a call received at a packetized voice network comprising receiving the call requiring authentication at any one of a plurality of ingress points for the network, routing the call from the one ingress point to an authentication server, authenticating the call in the authentication server and routing the call to an egress point on the network, instead of the authentication server, after authenticating the call.

In another embodiment, the invention provides a communication network comprising a packet switched network including one or more gateways coupled to receive calls for the network requiring a feature service. The communication network includes a feature platform that is coupled to connect to the calls requiring the feature service received at the one or more gateways, provide the feature service and cause the calls to be redirected to another point on the network after the feature service is provided.

BRIEF DESCRIPTION OF THE DRAWINGS

The present invention may be better understood, and its numerous objects, features, and advantages made apparent to those skilled in the art by referencing the accompanying drawings, in which the use of the same reference symbols in different drawings indicates similar or identical items.

DESCRIPTION OF THE PREFERRED EMBODIMENT(S)

Figure 1:
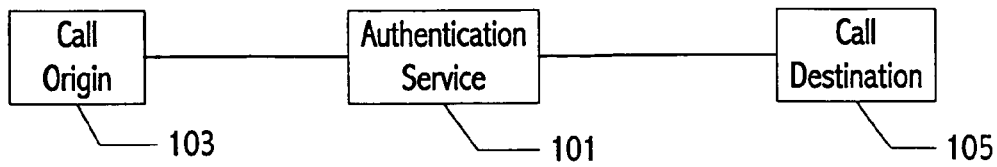
FIG. 1 illustrates the in-line relay connection of a prior art authentication service.
Figure 2:
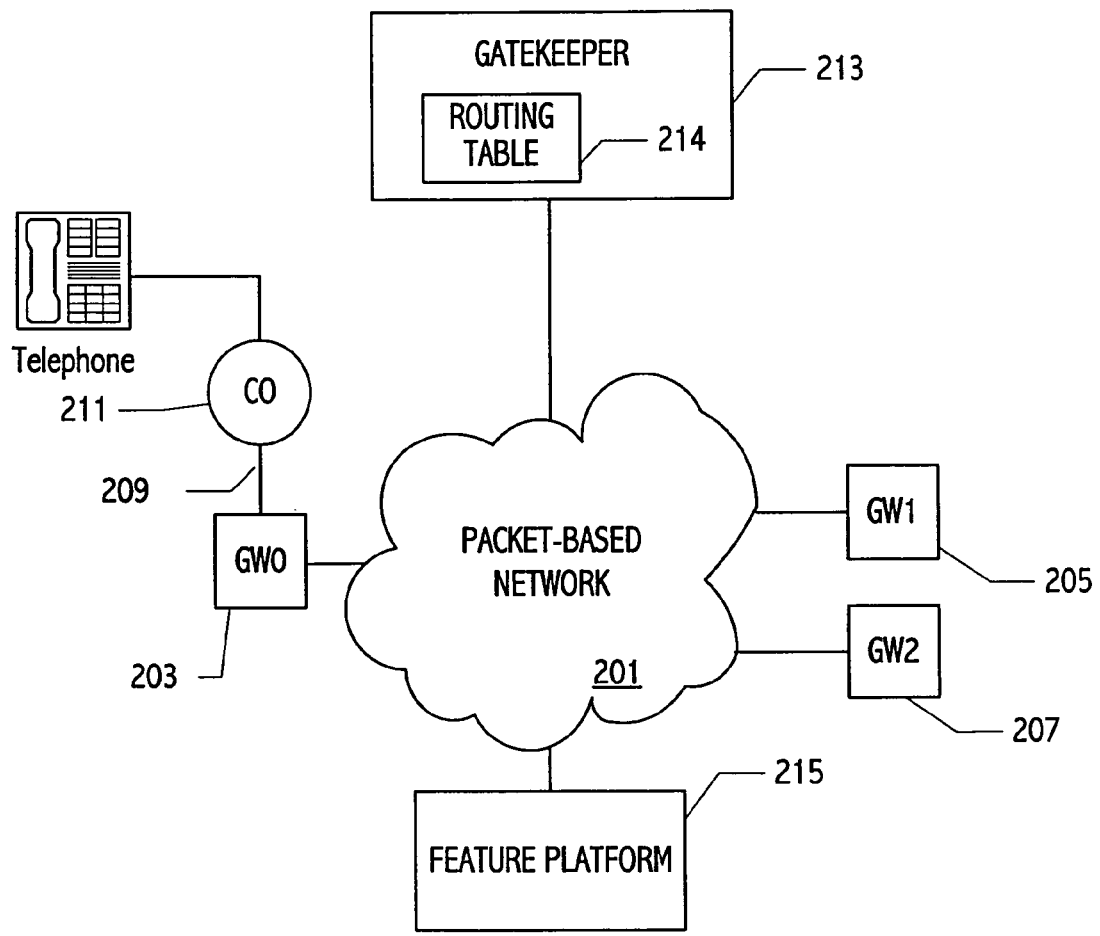
FIG. 2 illustrates a communication network configured with a centralized feature platform for authentication and/or other services.

Referring to FIG. 2, in one embodiment of the invention, a packet-based communication network 201 provides telecommunication services operating in accordance with a communication standard such as the International Telecommunications Union (ITU) H.323 standard, which provides for packet-based multi-media communication including transmission of real-time audio, video, and data communications. The H.323 standard specifies the components, protocols, and procedures providing multi-media communication over a variety of packet-based networks including Internet Protocol (IP)-based networks. The H.323 standard can be used for transmission of various combinations of audio, video and data, including audio only (for IP telephony applications); audio and video; audio and data; or audio, video and data. Note that the use of the H.323 standard in the described embodiments is exemplary only. Other emerging or existing standards for packet-based voice, video or data communication, may also be used to implement the teachings described herein.

Referring still FIG. 2, packet-based network 201 includes a plurality of ingress and egress points identifies as gateway 0 (GW0) 203, gateway 1 (GW1) 205 and gateway 2 (GW2) 207. One or more of the gateways, e.g., gateway 203, may be connected via trunk line 209 to a central office 211 of a public switched telephone network (PSTN). Each gateway provides a connection between two different kinds of networks. For instance, gateway 203 provides a connection between the PSTN and packet based network 201. In order to connect the different networks, the gateway has to translate protocols appropriately for call setup and release, and e.g., convert data to and from the various encoding and compression techniques utilized on the different networks. Such gateways are known in the art and utilized for example, in H.323 based networks interfacing to a PSTN. The gateways may also connect one packet-based network to another packet-based network.

In addition to the gateways, exemplary packet based network 201 includes gatekeeper 213. Gatekeeper 213 provides a control function within network 201. For example, gatekeeper 213 may provide such network management services as call routing, addressing, bandwidth management, accounting and billing. Network 201 also includes feature platform 215 which provides a centralized location for feature services. For example, feature platform 215, in one embodiment, provides an authentication service for calls coming into the gateways. Rather than have each gateway have the necessary support to provide various feature services, the present invention provides a centralized location to provide such services. That allows each of the gateways to be less complex and easier to maintain. It is easier to change one or more centralized locations rather than each of the gateways in the system for modifications, upgrades, maintenance and expansion.

Figure 3:
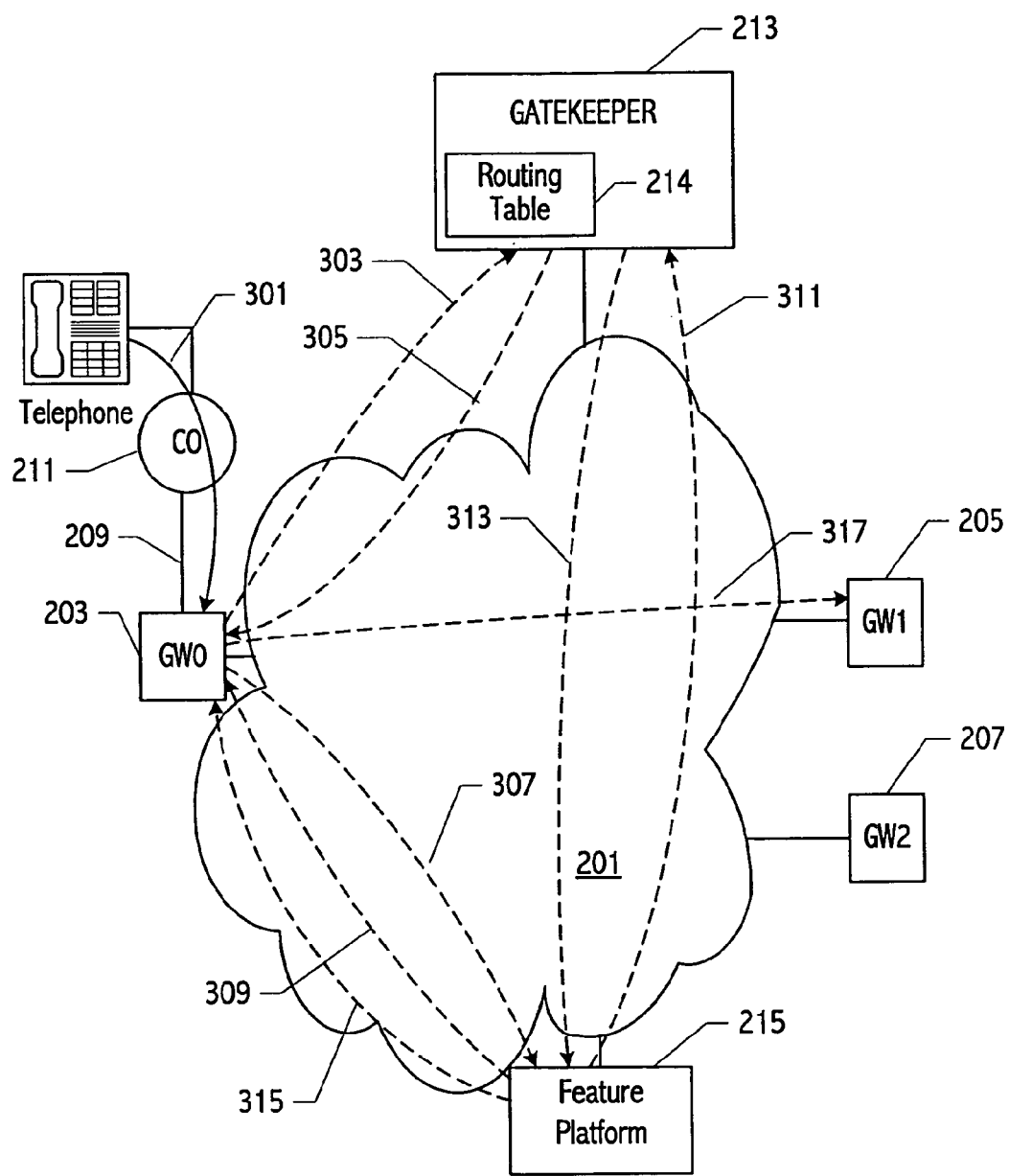
FIG. 3 illustrates a call flow in the system of FIG. 2 according to one embodiment of the invention.

The call flow of an exemplary authentication service will now be described for the network illustrated in FIG. 2. Referring to FIG. 3, assume a calling card call 301 is received at gateway 203 through central office 211. Gateway 203 requests from gatekeeper 213 via query 303 an IP address that corresponds to the 800 number dialed by call 301. Assume in the example that the 800 number is utilized by calling cards. Based on that number, gatekeeper 213, utilizing a routing table 214, informs gateway 203 via packet(s) 305 that the call should be connected to feature platform 215 for authentication. Call 301 is then connected to feature platform 215 via the packet switching network as shown at 307.

Feature server 215 may include such capability as voice prompting that prompts the user to enter needed additional information to complete the authentication process, such as a calling card number. The caller may also be prompted for the destination number if that has not already been entered, as shown at 309. That prompt is routed through the packet-based network to gateway 203, which converts the prompt to an appropriate protocol for the PSTN network. There may be multiple prompts and responses depending on the exact nature of the service provided. For example, the caller may be prompted for a calling card number, a destination number, a credit card, a personal identification number or some other credential required to complete the call. The PSTN provides the responses as DTMF (Dual Tones Multi-Frequency) tones used by touch-tone telephones which are captured by the gateway. The captured DTMF tones are used to validate or reject the call. If validated, DTMF capture is used for the destination number or other information provided by the caller.

Once feature platform 215 has authenticated the call, i.e., determined that the calling card number is legitimate and obtained the destination number, it can disassociate itself from the call. That is, feature platform 215, based on the destination number provided by the calling party, requests appropriate routing information from gatekeeper 213 via packet(s) 311. Gatekeeper 213 responds with packets 313, which include the IP address for the destination number. Assume the destination for the call is a telecommunications network coupled to gateway 205. The call transfer information is provided by feature platform 215 (or by gatekeeper 214) to gateway 203 so the call can be routed to connect gateway 203 to gateway 205 via packet(s) 317. Thus, call 301 is now connected through packet based network 201 to gateway 205 without any need for further participation of feature platform 215 in the link between gateway 203 and gateway 205. Note that the destination for the call could also be internal to network 201 rather than external through gateway 205.

The transfer facility to redirect the call to the other egress point (e.g., gateway 205) from feature platform 215 may utilize a transfer mechanism provided by a number of different underlying protocols. In one environment, the transfer facility provided under H.450.2 may be utilized, which is a supplemental standard for H.323. In a load sharing environment, the transfer facility provided in H.450.3 may be utilized. Transfer capabilities provided by various emerging protocols, such as Simple Gateway Control Protocol (SGCP), Media Gateway Control Protocol (MGCP), Megaco, Session Initiation Protocol (SIP), which is a signaling protocol for Internet conferencing and telephony, or Internet Protocol Device Control (IPDC) protocol, may be used to redirect the call. The particular transfer facility used is not important as long as the functionality of redirecting the call according to the teachings herein is accomplished.

Feature server 215 is no longer needed for the call and thus packets for the remainder of the call are not routed to or through feature server 215. Thus, feature server 215 is available again to provide services requested by any gateway (or any other node on the network) that requires the services provided without having to serve as a relay for the remainder of the authenticated call. While the authentication service may validate the call, which results in redirecting the call to an egress point or other point on the network, it is also possible that the authentication service determines that the call should be dropped. In that case, the feature server informs both the gateway and the gatekeeper.

The authentication service is not limited to calling cards, PIN numbers or other user entered data. In fact, the authentication service may validate that the caller is authorized to access network based on Automatic Number Identification (ANI) information (i.e., the calling number) to verify that the number is authorized for a particular type of service. ANI information is used in conventional telephone networks to provide such services as caller ID. For example, a subscriber may subscribe to a long distance service carried over packet-based network 201, the ANI being used to authenticate that the call is from a subscriber.

Other types of services can also benefit from the ability to provide a central intelligent function which can then disassociate itself from the subsequently connected call. Another example of such a service is a follow-me service in which a subscriber is reached at one number regardless of the actual location of the subscriber. Thus, a received call can be routed to a wireline, a cellular number, voice mail, email, pager or other number associated with the called number. The service may implement a time manager for routing. If the feature platform determines that the call should be routed to another location, the call is redirected to that location and feature platform 215 can be disassociated from the call. That is, it does not function as an in-line relay for the call. Additionally, the feature server could be used for a best effort follow-me service, in which the system has a list of possible locations and methodically tries numbers until the subscriber is reached. Also, the feature server can provide a management function capable of being called into and provided a current location for the subscriber.

Other features may be supported by feature platform 215. For example, calls may be routed to different numbers based on time of day, vacation plans or any other of a variety of conditions that can be specified for call routing. Any number that is received that requires special service features can be routed to a centralized feature platform that can provide the services requested. For example, assume a call is received into a gateway over trunk 209. When that call is received, the gateway requests a look-up in the routing table and the call is routed to feature server 215, if the called number is a number associated with a follow-me or other feature service.

In another application, the centralized feature service platform system can also be used for pay-per-stream distribution of media. In such an application, the centralized feature service platform authenticates an endpoint such as a set-top box ordering the particular media such as a movie. Once the endpoint is authenticated, the feature service platform can redirect the connection so a feature server actually providing the streaming media is coupled to the endpoint. Note that the ordering device does not necessarily have to be the endpoint to which the streaming media is directed. In addition, the endpoint may be inside or outside of the network.

A variety of other applications can be supported by a centralized feature server. For example, the centralized feature service platform can provide backend clustering capabilities on messaging services, allowing providers a way of redirecting voice mail/messages to an alias associated with site. It can also setup conferences without centralization when the protocol used supports multiple streams. The feature platform can also be coupled with powerful databases capable of announcing current ratings or prices.

Thus, such feature services as debit/calling card, one number/follow-me, call back service, call screening, student phone home, as well as other similar services commonly offered in the circuit-switched world can advantageously use the centralized feature platform described herein. The centralized feature platform is also useful for call centers since frequently call center agents are not centralized and companies use large PBXs to connect callers and agents.

In one application in which calls originate in the network and are directed to outside the network, for example in a telemarketing environment, the centralized feature platform can be used to control calling to numbers external to the network. Thus, instead of providing an authentication service for an incoming call into the network, the feature platform provides call control for outgoing calls from the network. The call control include determining what numbers are called. As in previous embodiments, once the calls are connected, the established calls are not routed through the feature platform but redirected for connection independent of the feature platform to an appropriate call agent.

The description of the invention set forth herein is illustrative, and is not intended to limit the scope of the invention as set forth in the following claims. Other variations and modifications of the embodiments disclosed herein, may be made based on the description set forth herein, without departing from the scope and spirit of the invention as set forth in the following claims.

What is claimed is:

1. A method comprising:
receiving a call at an ingress gateway of a packet switched network, the call destined for a destination number serviced by the network;
querying by the ingress gateway to a gatekeeper of the network, to obtain a destination address of the network corresponding to the destination number for the call;
responding by the gatekeeper to the ingress gateway, with a service address of the network for a feature platform of the network independent of the gatekeeper;
directing the call by the ingress gateway for connection to the feature platform via the network at the service address;
receiving the call by the feature platform over the network;
performing a service by the feature platform related to the call; and
after performing the service, unless the service terminates the call, routing the call by the ingress gateway and the network, independent of the feature platform, to the destination address for the destination number, to connect the call between the ingress gateway and the destination number.

2. The method as recited in claim 1 wherein the packet switched network is a voice network.

3. The method as recited in claim 1 further comprising the step of authenticating the call for a second service, as the service provided in the step of performing.

4. The method as recited in claim 3 wherein the step of authenticating validates a calling card number of the call.

5. The method as recited in claim 3 wherein the step of authenticating validates a personal identification number associated with the call, the service queries the ingress gateway for a personal identification number which, if delivered to the ingress gateway in response to the query by the service, is in the step of authenticating by the service accepted if valid and the call is continued, and otherwise rejected and the call is terminated.

6. The method as recited in claim 3 wherein the step of authenticating includes voice prompts to the ingress gateway.

7. The method as recited in claim 3 wherein the step of authenticating employs Automatic Number Identification (ANI) information as a basis for authentication of the call.

8. The method as recited in claim 1 wherein the step of performing the service includes a follow-me service.

9. A communication network comprising:
a packet switched network;
one or more entry gateways connected to the network to initiate calls destined for routing by the network to respective one or more destination numbers, the calls requiring a feature service for the calls;
at least one gatekeeper connected to the entry gateways for providing to the entry gateways a service address of the network for the calls;
a feature platform connected to the network and having the service address, the feature platform is independent of the at least one gatekeeper, the feature platform for receiving the calls from the entry gateways in response to the gatekeeper providing the service address to the entry gateways, and if any of the calls are received by the feature platform over the network from any of the entry gateways, the feature platform provides the feature service for the call so received;
one or more respective destination gateways connected to the network to receive the calls routed by the network from the respective one or more entry gateways, wherein for each call, at least one of the destination gateways capable of receiving the call for the destination number;
wherein, for each call not terminated by the feature service, the feature platform disassociates from the call after the feature service is provided by the feature platform, allowing the call to be routed by the network and the entry gateway of the call, independent of the feature platform, to the destination number for the call at one of the destination gateways capable of receiving the call for the destination number.

10. The communication network of claim 9 wherein the feature service is an authentication service.

11. The communication network as recited in claim 10 wherein the authentication service includes voice prompting.

12. The communication network as recited in claim 10 wherein the authentication service utilizes Automatic Number Identification (ANI) information for authentication purposes.

13. The communication network of claim 9 wherein the feature service is a follow-me service.

14. The communication network as recited in claim 9 wherein the one or more calls are routed on the network using a media gateway control protocol.

15. The communication network as recited in claim 9 wherein the one or more calls are routed to the feature platform according to a destination number identification service (DNIS).

16. The communication network as recited in claim 9 wherein at least one of the entry gateways receives at least one of the calls from a publicly switched telephone network (PSTN).

17. A method of calling a destination device over a digital packetized voice network, comprising the steps of:
   receiving a call at an ingress point of the network, the call is made to a destination number for the destination device;
   routing the call by the ingress point and the network to a gatekeeper of the network;
   receiving the call over the network by the gatekeeper;
   looking up by the gatekeeper, upon receiving the call by the gatekeeper, a destination address of the network for an egress point of the network available to connect the call to the destination device at the destination number;
   detecting by the gatekeeper, upon receiving the call by the gatekeeper, that the call should receive a call service of a centralized feature platform server of the network;
   directing by the gatekeeper the ingress point and the network to route the call to the centralized feature platform server for the call service;
   routing the call from the ingress point by the ingress point and the network to the centralized feature platform server of the network, the centralized feature platform server is independent of the ingress point, the egress point and the gatekeeper;
   receiving the call over the network by the centralized feature platform server;
   performing the call service for the call by the centralized feature platform server upon receiving the call by the centralized feature platform server;
   after the step of performing the call service for the call by the centralized feature platform server and unless the call service dictates termination of the call, disassociating from the call by the centralized feature platform server;
   after the step of disassociating from the call, routing the call by the ingress point and the network, independent of the centralized feature platform server, to an egress point of the network for the destination number of the destination device to connect the call to the destination device.

18. A method of operating voice traffic bearing packet switched network, the method comprising the steps of:
   receiving at a gateway to a packet-switched network, an information stream including encoded voice-band traffic originating from a voice terminal outside the packet-switched network and communicatively connected to the gateway;
   routing the information stream by the gateway and the network to a gatekeeper of the network;
   determining by the gatekeeper that an authentication service is to be performed for the information stream;
   directing the gateway by the gatekeeper to route the information stream over the network to an authentication service of the network, the authentication service is independent of the gatekeeper;
   signaling by the gateway over the packet-switched network to the an authentication service of the network, and thereby establishing a connection between the voice terminal and the authentication service over the network through the gateway; and
   authenticating based on the step of signaling by the authentication service of the network; and
   if the step of authenticating is successfully completed, routing by the gateway and the network, independent of and disassociated from the authentication service, the encoded voice-band traffic of the information stream from the gateway to a target device by the network independent of the authentication service.

19. The method as recited in claim 18, wherein the step of authenticating includes credentialing an aspect of the information stream by the authentication service.

20. The method as recited in claim 19, wherein the step of authenticating includes bi-directionally communicating the encoded voice-band traffic between the voice terminal and the authentication service through the gateway over the network.

21. The method as recited in claim 18, wherein the step of signaling delivers a first destination identifier as at least part of the encoded voice-band traffic originating from the voice terminal, through the gateway, over the network, to the authentication service of the network.

22. The method as recited in claim 21, wherein the step of signaling delivers a second destination identifier from the voice terminal coincident with the step of authenticating; and
   wherein the second destination identifier is selective for the target device.

23. The method as recited in claim 21,
   wherein the first destination identifier includes a phone number of the authentication service; and
   wherein the step of signaling delivers a second destination identifier selective for the target device, from the voice terminal coincident with the authenticating.

24. A method of operating a packet switched network, the network routes communications of the network based on network addresses, comprising:
   connecting a service feature platform to the network;
   receiving over the network at a gatekeeper of the network a request to authenticate an endpoint of the network for a pay-per-stream distribution of media;
   routing by the gatekeeper the request over the network to the service feature platform, the service feature platform is independent of the gatekeeper;
   receiving at the service feature platform over the network the request;
   authenticating by the service feature platform in response to the request;
   if the step of authenticating is successfully completed, directing by the service feature platform a pay-per-stream distribution of media from a media server in the network, the media server is independent of the service feature platform;
   after the step of directing, disassociating the service feature platform from the request, the gatekeeper and the media server for the pay-per-stream distribution of media for the endpoint; and
   routing by the network, independent of the service feature platform, the pay-per-stream distribution of media from the media server to the endpoint over the network.

25. The method as recited in claim 24 wherein the step of requesting is performed by the endpoint and the request to authenticate is routed by the gatekeeper and the network from the endpoint to the service feature platform.

26. The method as recited in claim 25 wherein the step of routing by the network delivers the pay per view distribution of media from the media server to an egress gateway of the packet switched network, and the endpoint obtains the media via communicative connection with the egress gateway independent of the network and the gatekeeper, and after the step of disassociating the service feature platform, independent of the service feature platform.

27. An apparatus comprising:
 a packet switched network including one or more egress points;
 an external telephone network communicatively connected to the one or more egress points;
 a plurality of call agents communicatively connected to the external telephone network;
 a respective unique destination number of the external telephone network for each of the plurality of call agents;
 a plurality of calls over the network, each destined for a respective one of the plurality of call agents at the respective unique destination number of the external telephone network;
 a feature platform connected to the packet switched network, capable of performing a call service for the plurality of calls;
 a gatekeeper of the network for receiving the plurality of calls and routing the plurality of calls to the feature platform of the packet switched network, the feature platform is independent of the gatekeeper and the egress points;
 wherein the feature platform is capable of receiving the calls over the network from the gatekeeper for the plurality of call agents, the feature platform performs a call service for the calls required for delivery of the calls over the packet-switched network to the external telephone network for the respective unique destination number;
 wherein if the feature platform successfully performs the call service for the call, the feature platform disassociates from the call and the network routes the call, independent of the feature platform, to one or more of the egress points to the external telephone network corresponding to the respective unique destination number for the call.

* * * * *